May 8, 1962  G. A. LAFITTE  3,032,879
DENTAL MIRROR
Filed July 9, 1958  2 Sheets-Sheet 1
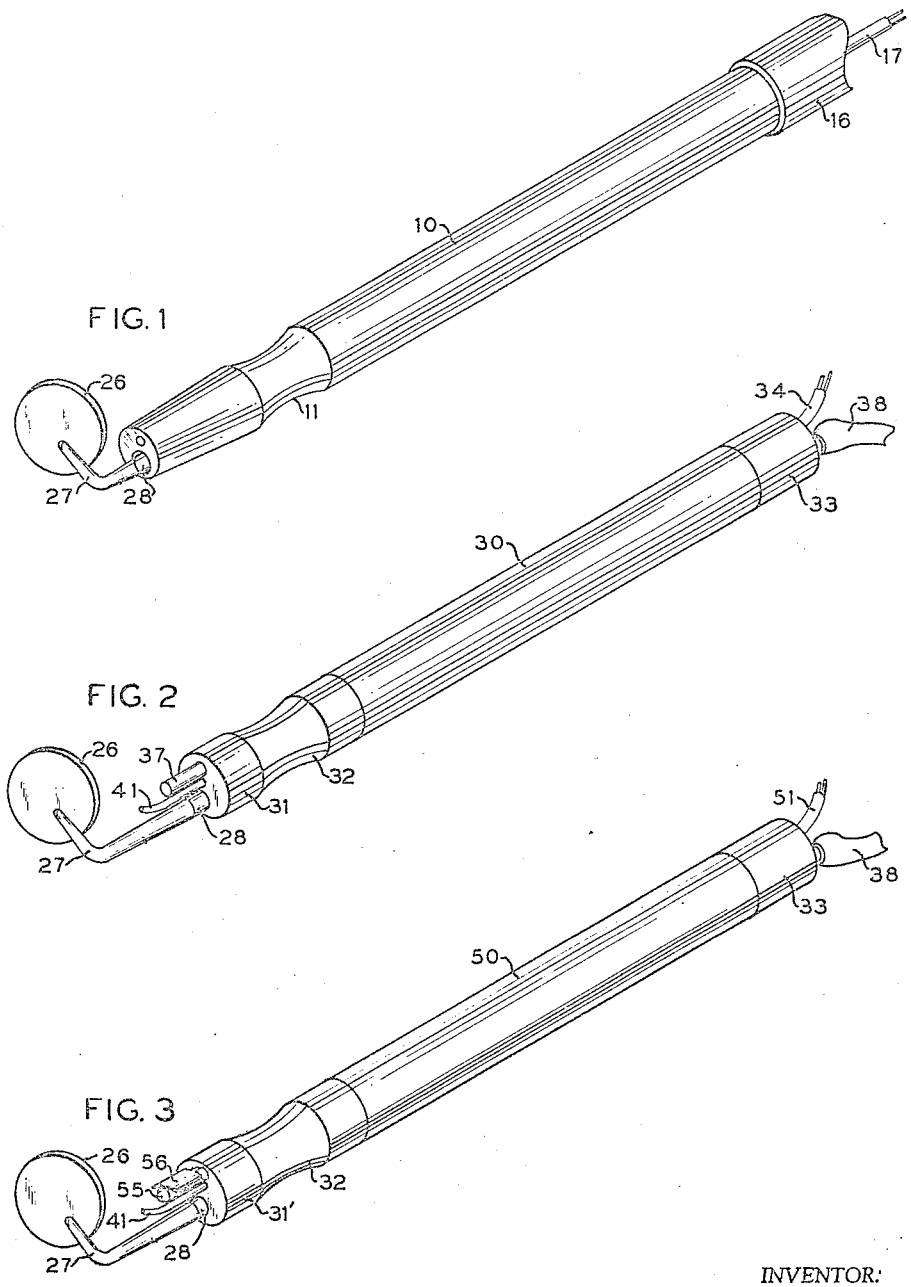
INVENTOR:
GEORGE A. LAFITTE
BY:
ATTORNEY May 8, 1962    G. A. LAFITTE    3,032,879
DENTAL MIRROR
Filed July 9, 1958    2 Sheets-Sheet 2
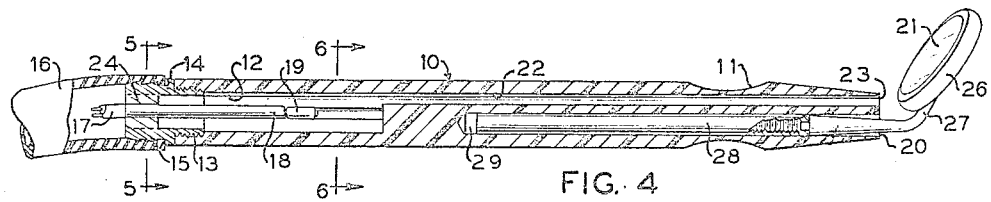
FIG. 4
   
FIG. 5    FIG. 6
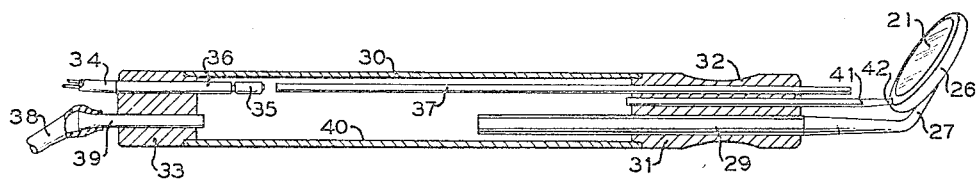
FIG. 7
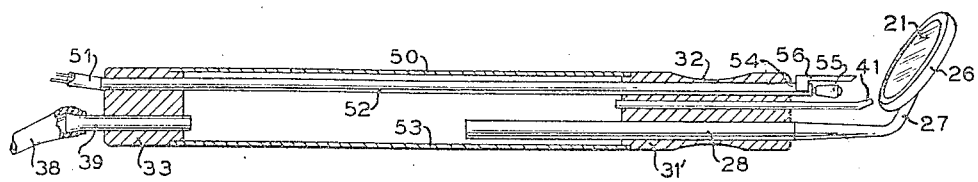
FIG. 8
INVENTOR:
GEORGE A. LAFITTE
BY:
ATTORNEY

United States Patent Office 3,032,879
Patented May 8, 1962

3,032,879
DENTAL MIRROR
George Arthur Lafitte, 801 Doctors Bldg., Atlanta, Ga.
Filed July 9, 1958, Ser. No. 747,445
5 Claims. (Cl. 32—69)

This invention relates to dental mirrors, and is particularly concerned with the problems of enhancing and maintaining improved visibility of selected areas of the mouth cavity.

While mirrors of the general character of the present invention have long been known, certain problems as to the visibility and maintenance of a clear image have not been wholly solved. Among such problems is that of providing internal illumination of the field independently of extraneous and independent illuminating means. Another problem is that of maintaining a clean mirror surface free from an accumulation of moisture and foreign matter resulting from dental operations. In such mirrors it is also desirable to provide readily adjustable means for altering the angularity of the mirror with respect to its handle as well as providing for longitudinal adjustments of the mirror.

With these and like problems in mind, the applicant has provided a rigid, durable and inexpensive dental mirror and hand assembly, in which the mirror may be longitudinally as well as rotatably adjusted with respect to the handle and in which there is provided a novel and improved means for illumination of the cavity at the area reflected by the mirror surface. The invention also provides for the direction of a fluid stream, such as water or air, across the mirror surface to dislodge foreign matter and accumulated moisture in order to maintain a clear vision at all times, thus avoiding the necessity of removing the mirror for frequent cleaning. It is therefore among the objects of the present invention to provide a novel and improved dental mirror which provides and maintains an improved clear field of vision during use thereof.

It is another object of the present invention to provide a dental mirror having a self contained means for illumination of the mouth cavity and of the mirror surface during operation.

A further object of the present invention is to provide a mirror of the character described including improved means for periodic or continuous cleaning of the mirror to remove condensed moisture and foreign matter from the surface.

It is also among the objects of the invention to provide a mirror of the character set forth which will be simple in construction and operation, readily controlled and adjusted, and well adapted to meet the demands of economic manufacture.

Numerous other objects, features and advantages of the present invention will be apparent from consideration of the following specification taken in conjunction with the accompanying drawings, in which:

FIG. 1 is a perspective view of one embodiment of the present invention.

FIG. 2 is a perspective view of a modification of the present invention.

FIG. 3 is a similar perspective view of further modification of the invention in which the light source is an external incandescent electric element.

FIG. 4 is a central, longitudinal cross section of the form of the invention shown in FIG. 1.

FIG. 5 is a transverse cross sectional view taken on line 5—5 of FIG. 4.

FIG. 6 is a cross sectional view taken on line 6—6 of FIG. 4.

FIG. 7 is a longitudinal cross sectional view, similar to FIG. 4, of that form of the invention shown in FIG. 2.

FIG. 8 is a similar longitudinal cross section of that form of the invention shown in FIG. 3.

Referring now to the details of construction presented in the drawings by way of illustration, it will be seen that the arrangement is of generally conventional outline, the body being the elongated cylindrical form, a circular mirror being secured by a longitudinal extension at the outer end of the body. In that form of the invention illustrated in FIGS. 1, 4, 5 and 6, the cylindrical handle 10 is formed as an integral body of light conducting substance. A suitable material is "Lucite," or any other such substance having the capacity of transmitting light longitudinally therethrough by polarization with little or no lateral permission of light from the side walls of the body. It will, of course, be understood, that there are numerous other substances having like characteristic, the invention is not limited to any one specific substance of this nature, a plain transparent body of glass or the like may well serve the desired purpose.

As shown in FIGS. 1, 4, 5 and 6, the body 10 is of generally cylindrical form having an annular recess 11 for conventional engagement for manipulation. As more clearly shown in FIG. 5, the outer free end of the body 10 is formed with an internal chamber 12 terminating in an internally threaded shoulder 13 adapted to threadedly receive a nipple 14. The outer surface of nipple 14 may be formed with annular serrations 15 to receive and engage a hollow flexible tube 16 through which air or other cleaning fluid may be supplied to the handle. Tube 16 encloses an electrical cable 17 extending into a rigid conductor sheath and bulb mount 18 for the support and energization of an internal illuminating bulb 19 disposed within the chamber 12. Since the body 10 is formed of light conducting material, it will be seen that upon energization of bulb 19 the illumination thereby provided will be picked up by the "Lucite" or other light conducting material, and transmitted internally through the body of the handle to emerge at the end 20. Light thus emitted from the free end 20 will be projected upon the circular mirror 21, whereby the cavity in which the mirror is inserted will be generally illuminated and the light reflected from the mirror will be focused specifically to the area under scrutiny.

Air or other cleaning fluid which may be transmitted to the handle through the tube 16 is adapted to pass from the chamber 12 through a longitudinal bore 22 to emerge at the end opening 23 for impingement against the mirror 21 in such manner as to blow or wash accumulated moisture and/or foreign matter from the mirror surface. As shown in FIG. 5, the nipple 15 is provided with spaced webs 24 supporting the element 18 while permitting free passage of air or other fluid from the tube 16, around the element 18, into the chamber 12 and therefrom through the duct 22 for discharge against the mirror. In conformity with the webs 24 it will be shown in FIG. 6 the internal configuration of the chamber 12 may be of cruciform configuration, the duct 22 registered with one of the branches 25 of such configuration to provide free flow of cleaning fluid.

The mirror 21 is of generally conventional circular formation, being of silvered glass or polished metal surrounded and supported by a bezel 26 which in turn is supported from the angularly turned mirror support shank 27. The present invention provides for the threaded engagement of the shank 27 with a longitudinally and rotatably adjustable supporting rod 28. The rod 28 is slidably and rotatably mounted within a bore 29 extending from the end 20 of the handle inwardly, preferably parallel with the duct 22 and preferably at one side of the axial center of the handle, as indicated. In the present form of the invention, the rod 28 is mounted with a frictional fit within the bore 29 so as to retain the rod in a manually adjusted position both longitudinally and rotatably with respect to the handle; however, the invention contemplates the use of other conventional means to supplement such frictional retention. From this construction, it will be seen that the mirror may be adjusted longitudinally outward or inward with respect to end 29 and the opening 23 of the duct 22. Rotational adjustment of the mirror is also provided by manual rotation of the rod 28 so that the relationship of the mirror surface to the handle may be widely varied as circumstances dictate.

In the use of this form of the invention, with the bulb 19 energized through the cable 17, light emitted from the bulb will be transmitted longitudinally through the body, without undue side propagation, to be projected from the end 29 against the mirror surface to generally illuminate the oral cavity and be reflected specifically to the area under scrutiny. It will further be understood that air or other fluid will be permitted to pass as desired under the control of the operator through the tube 16 and through the chamber 12 and duct 22 to be emitted from the opening 23 to impinge against the mirror so that accumulated moisture or foreign matter will be blown off or washed from the mirror surface. In operation, it may be preferable to provide means (not shown) controlled by the operator to discharge cleaning fluid through the device only in such pulsations and intervals as may be necessary to provide for maintenance of a clean mirror without the necessity of a continuous fluid stream.

In that form of the invention shown in FIGS. 2 and 7, the handle is formed as a hollow cylindrical tube 30 of opaque material. The tube 30 is closed at its outer end by a grip forming plug 31 having a recessed seat 32 to accommodate the fingers of the operator. The opposite end of the handle 30 is provided with a closure plug 33 which receives therethrough a cable 34 for electrical energization of a light bulb 35 supported by a tubular bulb mount 36. Within the tube 30 there is provided a light conducting rod 37 of "Lucite" or a like light conducting medium, such as described with respect to the material of the body 10 of FIG. 1. Illumination from the bulb 35 is carried through the plug 31 by the rod 37 which extends outwardly therefrom as shown to direct light from the bulb to the mirror surface. In this form of the invention, the air or cleaning fluid is delivered to the handle from a flexible tube 38 and then through a duct 39, carried by the plug 33, and into the central cavity 40 of the hollow handle from which it is discharged by means of a tube 41 through the plug 31 for discharge as at 42 to the mirror surface for cleaning in the manner hereinbefore set forth. As in FIG. 1, the mirror 21 is supported from its bezel 26 by the shank 27 which in turn is supported in the longitudinally and rotatively mounted bar 28 frictionally engaged in the plug 31 in the manner of the support of the rod 28 within the handle. In this form of the invention, some economy of manufacture may be achieved since the tubular handle 30 may be less expensive than the solid handle of FIG. 1; and, further, it is seen that the end plugs may be readily manufactured without excess cost.

Referring to FIGS. 3 and 8 of the drawings, it will be seen that the invention may also be carried out by the use of a tubular sleeve 50, similar to that indicated at 30 in FIGS. 2 and 7, and that the cleaning fluid may be directed as in FIGS. 2 and 7. In this form of invention, however, the cable 51 is encased within a longitudinally extending conduct 52 which extends the full length of the handle, traversing the full length of the internal chamber 53 and plug 31 to emerge at 54 where an external illuminating bulb 55 is provided, preferably shielded by a reflector 56. Thus, in this form of the invention, the source of illumination is positioned adjacent the mirror 21.

In considering the foregoing structure of the various modifications of the invention, it will be understood that the invention is not limited or confined to the specific structural details herein set forth, and that in practice numerous changes, modifications and the full use of equivalents may be resorted to without departure from the spirit or scope of the invention as defined in the following claims.

I claim:
1. A dental mirror including a generally cylindrical handle body, a mirror supported by one end of said body, means for supplying cleaning fluid through the opposite end of said body, and means for directing said cleaning fluid from the opposite end of said body against said mirror for cleaning the mirror, means for supplying electrical energy through said opposite end, an electric light bulb energized by said means, and means for directing illumination from said bulb onto said mirror.

2. A dental mirror including a generally cylindrical handle body, a mirror supported by one end of said body, means for supplying cleaning fluid through the opposite end of said body, and means for directing cleaning fluid from said one end of said body against said mirror for cleaning the mirror, means for supplying electrical energy through said opposite end, an electric light bulb energized by said means, and means for directing illumination from said bulb onto said mirror, said last mentioned means including a light conducting element.

3. A dental mirror including a generally cylindrical handle body, a mirror supported by one end of said body, means for supplying cleaning fluid through the opposite end of said body, means for directing said cleaning fluid from said one end of said body against said mirror for cleaning the mirror, means for supplying electrical energy through said opposite end, an electric light bulb energized by said means, and means projecting from said one end of said body for directing illumination from said bulb onto said mirror.

4. A dental mirror including an elongate cylindrical handle of light conducting material, there being provided an air passageway through said handle, and means carried by said handle for supplying illumination to one end of said handle for transmission therethrough and out the opposite end onto said mirror.

5. In a dental mirror, a hollow cylindrical handle, closure plugs at opposed ends of said handle, a shank slidably projecting through one of said plugs, a mirror carried by said shank, there being provided an opening in said one of said plugs for the passage of fluid from the hollow portion of said handle outwardly against said mirror and means connected to the other of said plugs for introducing fluid into said handle, and illuminating means carried by said plugs for illuminating said mirror.

References Cited in the file of this patent

UNITED STATES PATENTS

| | | |
|---|---|---|
| 1,989,162 | Barr | Jan. 29, 1935 |
| 2,176,620 | Beam | Oct. 17, 1939 |
| 2,746,450 | Lady et al. | May 22, 1956 |
| 2,834,109 | O'Hara | May 13, 1958 |